(12) United States Patent
Scheurich

(10) Patent No.: US 7,356,706 B2
(45) Date of Patent: Apr. 8, 2008

(54) PERSONAL AUTHENTICATION METHOD AND APPARATUS SENSING USER VICINITY

(75) Inventor: Christoph E. Scheurich, Santa Cruz, CA (US)

(73) Assignee: Intel Corporation, Santa Clara, CA (US)

( * ) Notice: Subject to any disclaimer, the term of this patent is extended or adjusted under 35 U.S.C. 154(b) by 736 days.

(21) Appl. No.: 10/262,040

(22) Filed: Sep. 30, 2002

(65) Prior Publication Data

US 2004/0064728 A1    Apr. 1, 2004

(51) Int. Cl.
*H04K 9/00*    (2006.01)
(52) U.S. Cl. .................. 713/186; 382/115; 382/116
(58) Field of Classification Search ............ 713/186; 726/17; 382/115–116
See application file for complete search history.

(56) References Cited

U.S. PATENT DOCUMENTS

| | | | |
|---|---|---|---|
| 4,893,005 A * | 1/1990 | Stiebel | 250/221 |
| 5,408,536 A * | 4/1995 | Lemelson | 382/115 |
| 5,548,660 A * | 8/1996 | Lemelson | 382/116 |
| 5,548,764 A * | 8/1996 | Duley et al. | 713/310 |
| 5,903,225 A * | 5/1999 | Schmitt et al. | 340/5.25 |
| 6,256,737 B1 * | 7/2001 | Bianco et al. | 713/186 |
| 6,487,402 B1 * | 11/2002 | Faus et al. | 455/411 |
| 6,764,012 B2 * | 7/2004 | Connolly et al. | 235/462.45 |
| 2004/0139348 A1 * | 7/2004 | Norris, Jr. | 713/200 |
| 2007/0063816 A1 * | 3/2007 | Murakami et al. | 340/5.82 |

* cited by examiner

*Primary Examiner*—Kambiz Zand
*Assistant Examiner*—Peter Poltorak
(74) *Attorney, Agent, or Firm*—Joni D. Stutman-Horn

(57) ABSTRACT

A security device restricting access to various machines, places or data, using a security device that is kept in close proximity to a portion of the body of a person and is activated to provide access to those machines, places or data to that person only when that person is confirmed to be a designated person, and which is automatically deactivated when it ceases to be in close proximity to that person's body.

24 Claims, 8 Drawing Sheets

PERSONAL AUTHENTICATION METHOD AND APPARATUS SENSING USER VICINITY

FIELD OF THE INVENTION

A method and an apparatus for authenticating persons for security purposes (i.e., restricting access by persons to various machines, places or data) is disclosed.

ART BACKGROUND

A need has long existed to restrict access by persons to machines such as automated teller machines (ATMS) or computers, places such as workplace office buildings or laboratories, and data such as personal bank accounts or corporate intellectual property. Over time, a number of techniques have been devised to answer this need.

Passwords or PINs (personal identification numbers) have long been used in restricting access to computers, ATMS, rooms in buildings, various types of accounts on internet websites or personal data, such as credit card or bank account information over a telephone or by way of a computer. Passwords can be effective when they are chosen carefully and carefully maintained in secret. However, it is all too common for passwords to be chosen that are all too easy for others to guess or to crack with software to be chosen, such as the name of one's pet or a nickname for a family member. It is also all too common for passwords to be shared with trusted friends or coworkers, or to be written someplace where they can be easily found, such as on a sheet of paper inside a desk drawer.

Security tokens carrying some form of unique identifier, such as badge reader cards with a magnetic stripe or other devices using radio frequency emissions have long been used, especially in restricting access to places such as workplaces or rooms within workplaces where information or equipment of high value is maintained. However, such security tokens can be lost by or stolen from the persons for whom they were intended, and until such a loss or theft is reported so that the security token may be deactivated, it is possible that the security token may be used to provide access to someone who is not meant to have it. It is also possible that the person to whom a security token has been provided may voluntarily give it to someone else, such as a coworker to let them gain access to something or some place as a favor.

More recently, technology has made possible the identification of specific persons by way of biometric readings such as finger print, palm print or retinal scans. Although such biometric-based techniques go far in ensuring the provision of access to only designated persons, the use of such technology is often too prohibitively expensive to provide each machine, door, etc., with a biometric reading device.

BRIEF DESCRIPTION OF THE DRAWINGS

The objects, features, and advantages of the invention as hereinafter claimed will be apparent to one skilled in the art in view of the following detailed description in which:

DETAILED DESCRIPTION

Figures 1A, 1B:
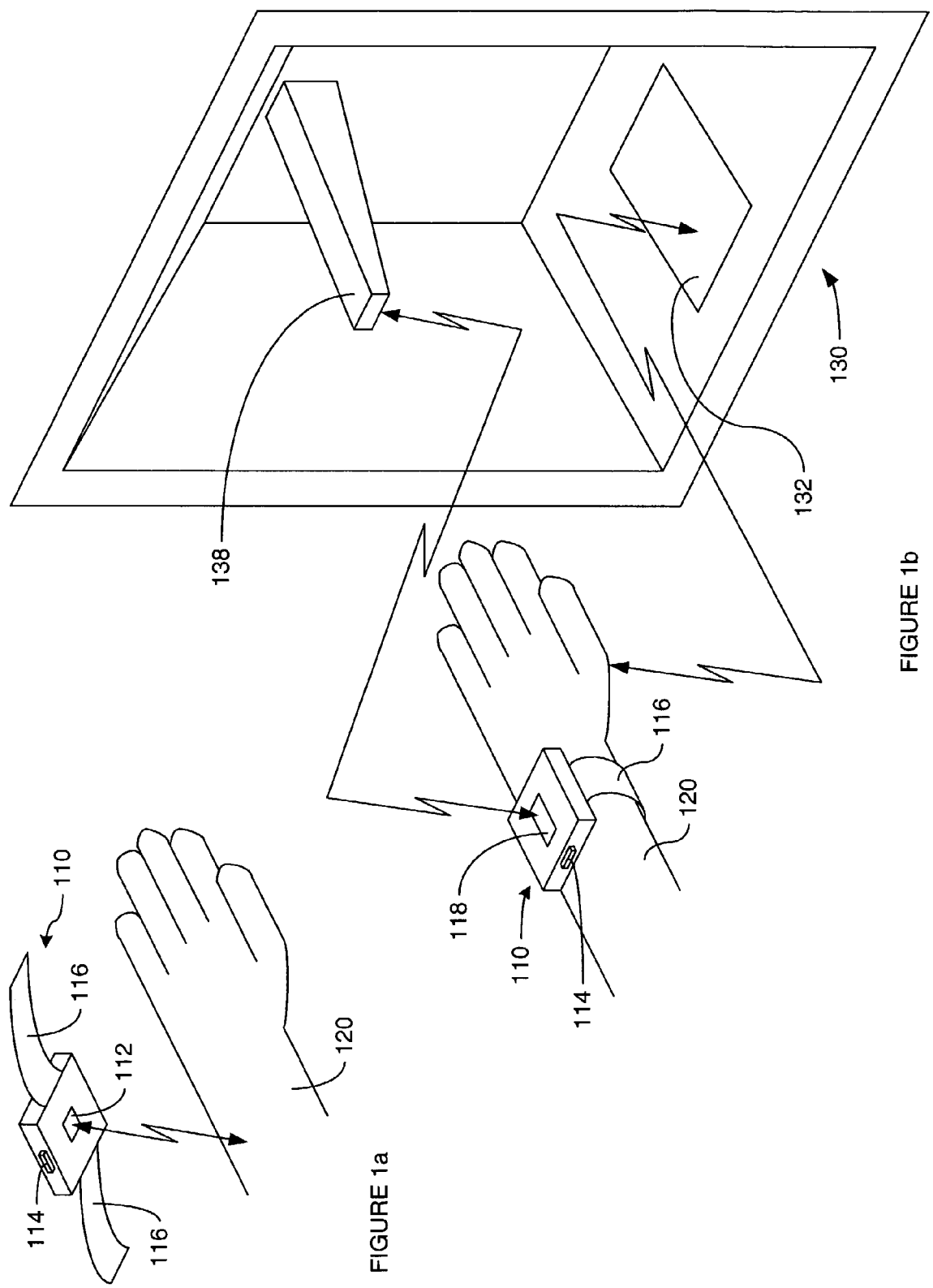
FIGS. 1a and 1b depict aspects of an embodiment of activating a security device.

Although numerous details are set forth for purposes of explanation and to provide a thorough understanding in the following description, it will be apparent to those skilled in the art that these specific details are not required in order to practice the claimed invention as hereinafter described.

A method and apparatus for restricting access by persons to places, machines and/or data using a security device that is selectively activated and that stays activated only while in close proximity to a designated person is disclosed. Specifically, a security device for a designated person is activated at a point where the identity of the designated person can be verified and the security device is in close proximity to the body of the designated person, and the security device automatically deactivates itself it ceases to be in close proximity to the body of the designated person. Although the discussion is largely centered on security devices that are worn in contact with the skin of a designated person, upon reading the description herein, it will be understood by those skilled in the art that the invention as hereinafter claimed is applicable to other forms of security devices that need only remain within close proximity to a designated person to an extent that allows a characteristic of the body to be monitored to confirm proximity within a predetermined range or degree. Such a monitored characteristic could be electromagnetic, heat or other emissions generated by the body of the designated person to be sensed. Alternatively, mechanisms such as the receipt of signals reflected from the body could also be used, as in the case of receiving ultrasound, radar, magnetism, lightwaves, etc., reflected by the body of the designated person.

What is meant by the term "close proximity" to the body of a designated person may vary depending on the form of security device and the technology used by a proximity sensor within the security device. Upon reading the description herein, those skilled in the art will understand that, a proximity sensor may employ any of a wide number of available technologies to sense the proximity of a security device to a person's body or to a portion of a person's body. As will be discussed, in some embodiments, "close proximity" may mean that a security device is in contact with the skin of a portion of the body portion of a designated person. In such embodiments, a proximity sensor may, as an example, sense body temperature, pulse or nerve impulses to determine if a security device is in contact with the skin, or a proximity sensor may use miniaturized Doppler radar to detect the presence or absence of blood flow through capillaries. Alternatively, in other embodiments, "close proximity" may mean a security device is carried on or near the body a designated person, but not necessarily in direct contact with that person's skin. Specifically, "close proximity" may mean keeping a security device within a predetermined distance to some portion of a designated person's body, or alternatively, close enough such that the level of some chemical or electromagnetic emission emanating from or reflected by a designated person's body does not fall below a predetermined level. A proximity sensor of such embodiments may use, for example, body temperature, nerve impulses, biochemical detection or miniaturized radar.

FIGS. 1a and 1b depict aspects of an embodiment of activating a security device. Security device 110 includes proximity sensor 112 to sense the proximity of security device 110 to body portion 120 of a designated person, and transceiver 118 to at least enable the activation of security device 110 using activation station 130. Security device 110 is depicted as being of a physical form that is somewhat akin to a typical wrist watch, having wrist band 116, and for the sake of the convenience of a designated person, may additionally provide the functionality of a wrist watch. Activation station 130 includes biometric reader 132 to take a biometric reading of body portion 120 of a designated person, and transmitter 138 to at least activate security device 110. Activation station 130 is depicted as being of a physical form that is somewhat akin to a typical ATM, being configured to be built into a wall or into the side of a kiosk.

As part of activating security device 110, security device 110 is brought into close proximity with the body of a designated person, as shown in FIG. 1a, and proximity sensor 112 monitors the proximity of security device 110 to body portion 120 to determine if the designated person has removed security device 110 from body portion 120. If the degree of proximity decreases below a designated threshold (i.e., if security device 110 is taken out of close proximity to body portion 120 by a pre-selected degree), then security device 110 automatically deactivates itself, if security device 110 had been earlier activated at the time of decrease in proximity.

As another part of activating security device 110, the designated person extends body portion 120 into activation station 130, allowing a biometric reading to be made of body portion 120 by biometric reader 132, and allowing transceiver 118 to interact with transmitter 138, as shown in FIG. 1b. Biometric reader 132 takes a biometric reading of body portion 120 and compares data from the biometric reading to data already stored elsewhere (not shown) to identify the person to which body portion 120 belongs, and specifically, to determine whether or not the person to which body portion 120 belongs is a known designated person for whom security device 110 should be activated.

The exact sequence of events required to activate security device 110 may vary between embodiments. In one embodiment, bringing security device 110 into close proximity to body portion 120 must be done before body portion 120 is extended into activation station 130, otherwise, security device 110 cannot be activated. It may be that security device 110 is configured to refuse to be activated by activation station 130 unless security device 110 is already in close proximity to body portion 120. Alternatively, it may be that activation station 130 cooperates with security device 110 to check whether or not security device 110 is already in close proximity to body portion 120, and that activation station 130 is configured to refrain from activating security device 110 until security device 110 is first in close proximity to body portion 120. However, in an alternate embodiment, security device 110 may be activated by activation station 130 before security device 110 is brought into close proximity to body portion 120, however, security device 110 is configured to remain active for only a relatively short period of time (perhaps, a few seconds) to permit security device 110 to be brought into close proximity to the designated person after being activated.

Although biometric reader 132 is depicted as taking a biometric reading from a hand in FIG. 1b, upon reading the description herein, it will be understood by those skilled in the art that biometric reader 132 may be based on any of a variety of possible technologies to take a biometric reading from any of a number of different points of the body of a person seeking to have security device 110 activated. Specifically, as FIG. 1bsuggests, biometric reader 132 may use any of a variety of cameras, laser scanning, etc., to read a finger print, palm print, full hand print; etc. However, biometric reader 132 may be a retinal scanner or perhaps a facial scanner making use of any of a variety of technologies to identify a person by way of patterns of blood vessels in the retina of a person's eye or by way of the configuration and/or dimensions of the features of a person's face. Still other alternatives may entail the use of blood samples or other various ways of identifying a person by way of DNA, and still other alternatives may entail the use of compact radar or magnetic field generators to scan specific tissues, regions or structures of a person's body.

Transceiver 118 and transmitter 138 may employ any of a number of technologies to enable interaction between transceiver 118 and transmitter 138 to at least enable transmitter 138 transmitting a signal, code or other form of security key to transceiver 118 to at least activate security device 110. Also, depending on the nature of the security key used and/or the degree of security desired, transmitter 138 may actually ben two-way transceiver of some type, as opposed to a one-way transmitter. In some possible embodiments, interaction between transceiver 118 and transmitter 138 makes use of a technology requiring line-of-sign transmission and reception, such as infrared or directional radio frequency signals. In other possible embodiments, interaction between transceiver 118 and transmitter 138 makes use of technology not requiring line-of-sight conditions, such as radio frequency, magnetic or sound signals.

Specifically, activating security device 110 may simply entail transmitter 138 transmitting some form of security key to transceiver 118 so that such a security key may be stored for use by the designated person, as will subsequently be discussed. In such an embodiment, transmitter 138 may truly be only a transmitter of a signal to security device 110. Alternatively, activating security device 110 may entail activation station 130 receiving a signal from security device 110, such as an identification code that either uniquely identifies security device 110, or some aspect of compatibility or other feature of security device 110. In such an embodiment, transmitter 138 may, in fact, be a two-way transceiver.

Upon reading the description herein, it will be understood by those of skill in the art that where non-directional signals or signals not requiring line-of-sight are used, it may be desirable for one or more signals transmitted between security device 110 and activation station 130 to be encrypted to try to prevent the interception of such signals from providing a way to defeat the security meant to be provided through the use of security device 110.

Also, although activation station 130 is depicted in FIG. 1b as having a configuration somewhat like an ATM, it will be readily appreciated that this is merely an example of one form of device to identify persons and selectively activate security device 110 as appropriate. It should be understood that automated devices for the selective activation of security key 100 may take any of a wide range of physical forms. It should also be understood that the activation of security device 110 may not be entirely automated. For example, in one embodiment, a person seeking activation of security key 100 may be required to meet with a security officer or the like to have the identity of the person confirmed and/or to have security device 110 activated manually.

Also depicted as part of security device 110 in both FIGS. 1a and 1b is activity control 114. Various embodiments of security device 110 and/or other forms of security device having forms differing from security device 110 may include activity control 114 to allow a designated person to turn off the ability of security device 110 to provide access to places, things and/or people. Activity control 114 may be configured to deactivate security device 110 without actually removing it from body portion 120. Alternatively, activity control 114 may simply provide a way to temporarily turn off the ability of security device 110 to interact with other devices, perhaps by turning transceiver 118 either partially or fully off, while allowing security device 110 to remain activated. It may be desirable to temporarily turn off the ability of security device 110 to interact with other devices to conserve limited battery power for security device 110; to prevent the unneeded or unwanted provision of access to persons, places or things; or in situations where laws or other requirements dictate that a variant of security device 110 where radio frequency signals are used by transceiver 118 be temporarily rendered incapable of transmitting radio frequency signals.

Figure 2A:
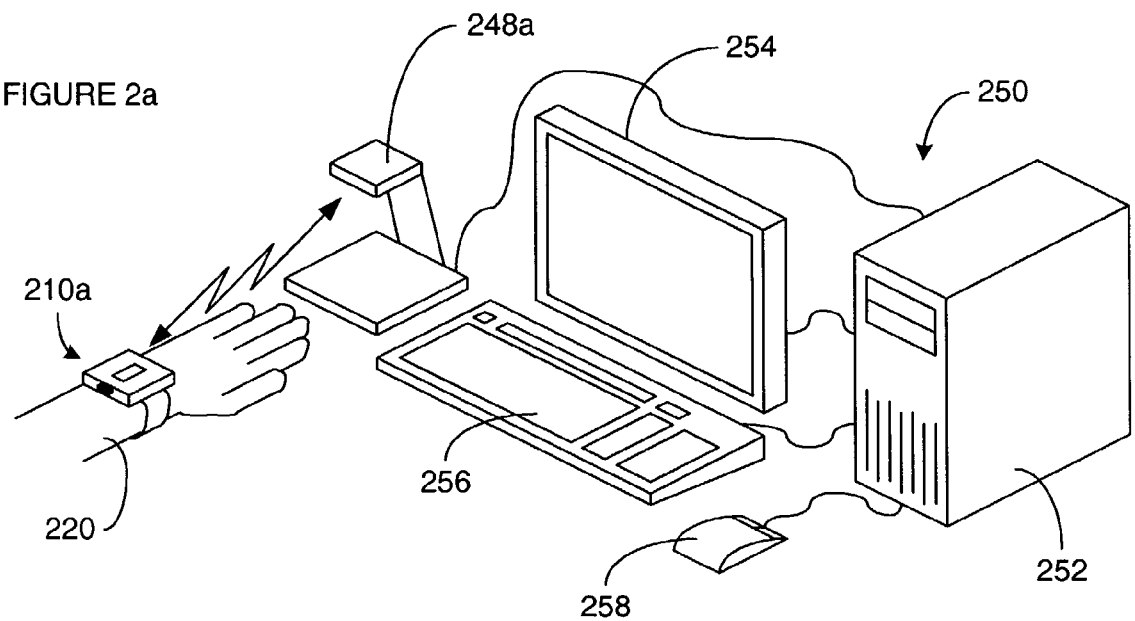
FIGS. 2a and 2b depict aspects of differing embodiments in which a security device is used to restrict access to a computer.
Figure 2B:
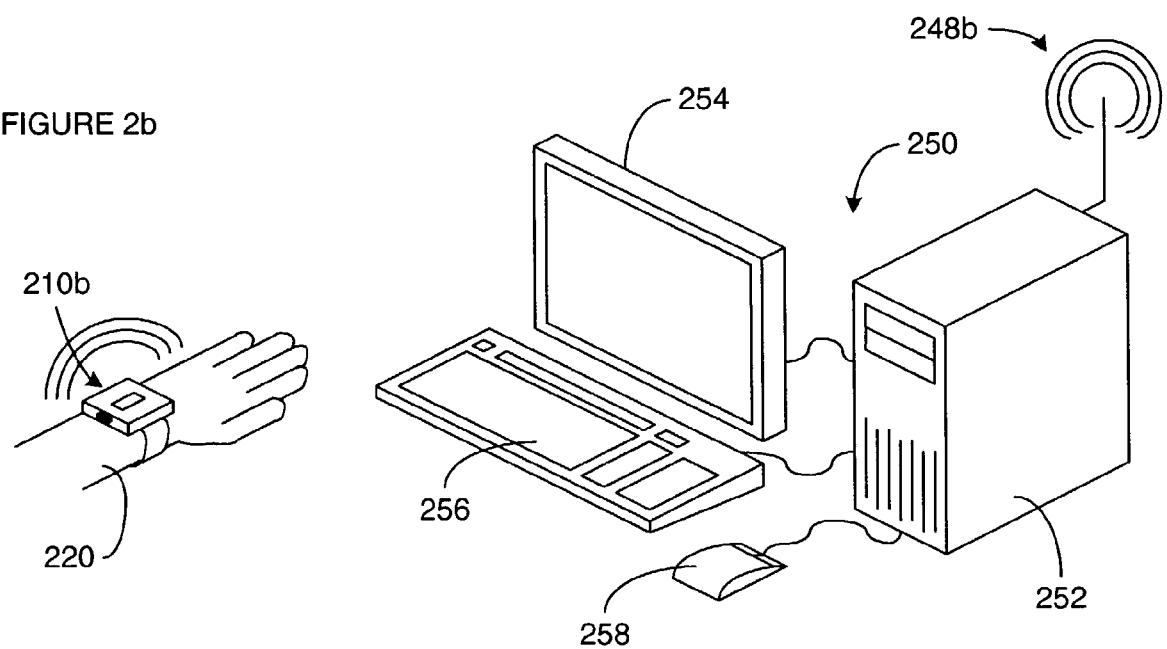

FIGS. 2a and 2b are largely parallel depictions of aspects of differing embodiments in which a security device is used to restrict access to a computer. Like security device 110 of FIGS. 1a and 1b, security device 210 in both FIGS. 2a and 2b is depicted as being of a physical form that is somewhat akin to a typical wristwatch. Security device 210 is shown as being in close proximity to body portion 220 of a designated person seeking access to computer system 250. As shown, computer system 250 is a typical single user computer system that includes chassis 252 having a processor and memory to both execute and store software, as well as interface circuitry to couple the processor and memory within chassis 252 to devices such as display 254, keyboard 256 and pointing device 258.

There is also interface circuitry within chassis 252 to couple the processor and memory within chassis 252 to receiver 248, and the processor and memory within chassis 252 execute and store software that causes computer system 250 to use receiver 248 to await the receipt of a signal from an active security device. When activated in a manner such as was depicted in FIGS. 1a and 1b, security device 210 transmits a signal to receiver 248. Upon receipt of this signal via receiver 248, the software causes computer system 250 to examine the received signal to determine if the signal is from a security device in close proximity to a designated person who should be permitted to have access to computer system 250. If it is determined that the signal is from a security device in close proximity to such a designated person, then the software provides the designated person with access to computer system 250, possibly by unlocking keyboard 256 and pointing device 258, and/or allowing data to which computer system 250 has access to be visible on display 254.

In FIG. 2a, receiver 248 is depicted as being a line-of-sight receiver configured such that a designated person must extend body portion 220 to bring security device 210 within the line of sight of receiver 248 for receiver 248 to receive a signal from security device 210. As was the case for line-of-sight signals between transceiver 118 and transmitter 138 of FIG. 1b, line-of-sight signals between security device 210 and receiver 248 may be based on such technologies as infrared or directional radio frequency signals. For example, in embodiments where receiver 248 employs a signal technology requiring a line of sight with security device 210, it will likely not be practical for security device 210 to be continuously maintained in a line of sight with receiver 248 since the designated person will likely want to move about while using computer system 250. For this reason, it may be the case in such embodiments that the designated person need only put security device 210 in a line of sight with receiver 248 for a brief period needed to gain access to computer system 250. Once access has been gained, software being executed by a processor of computer system 250 may cause access to be revoked (i.e., "lock" computer system 250) if a pre-selected period of time has elapsed in which there has been no activity indicating that the designated person is still using computer system 250, such as pressing keys on keyboard 256 or moving a pointer shown on display 254 by use of pointing device 258.

In FIG. 2b, receiver 248 is depicted as being a radio frequency receiver not requiring a line of sight between receiver 248 and security device 210 to receive a signal from security device 210. As was the case for such non-directional signals between transceiver 118 and transmitter 138 of FIG. 1b, non-directional signals between security device 210 and receiver 248 may be based on such technologies as radio frequency, magnetic or sound signals. As was previously discussed, where non-directional signals (i.e., signals not requiring line-of-sight) are used, it may be desirable for one or more signals transmitted between security device 210 and receiver 248 to be encrypted to try to prevent interception of such signals from providing a way to defeat the security meant to be provided through the use of security device 210. In embodiments where receiver 248 employs a non-directional signal technology, it would be possible for access to computer system 250 to be automatically gained whenever security device 210 is brought close enough to receiver 248 for signals from security device 210 to be received by receiver 248. In other words, it would be possible for software being executed by a process or computer system 250 to provide access to computer system 250 whenever security device 210 was close enough to receiver 248 for the designated person to be conceivably able to use computer system 250.

The use of such non-directional signal technology could provide greater convenience for a designated person in that there would be no need to take deliberate action to gain access to computer system 250, such as extending body portion 220 to bring security device 210 into a line of sight with receiver 248. In effect, the use of non-directional signal technology would essentially allow a designated person to be automatically provided with access to computer system 250 by simply approaching computer system 250. However, such convenience may cause undesired results, such as the unwanted granting of access to many different machines or other objects to which access is being restricted at the same time in situations where receivers for multiple machines and/or objects are positioned closely together. The use of line-of-sight signal technology would provide a designated person with an opportunity to choose to gain access only to the machines and/or objects that the designated person wishes to have access.

Figure 3:
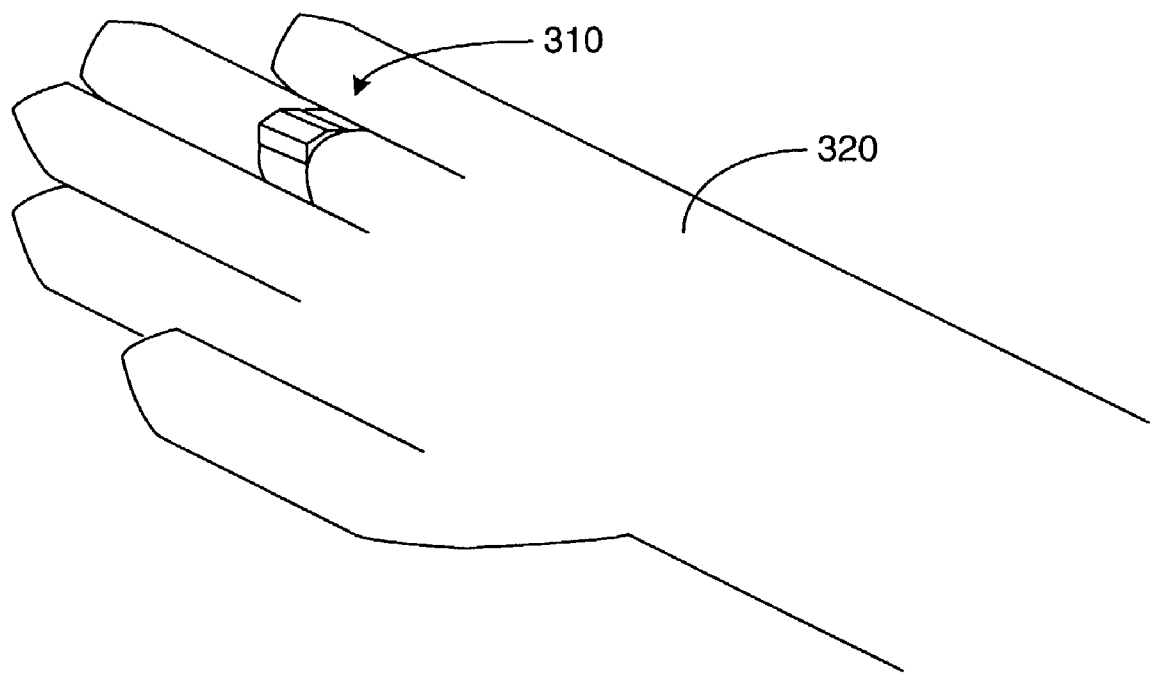
FIG. 3 depicts an alternate embodiment of a security device.
Figure 4:
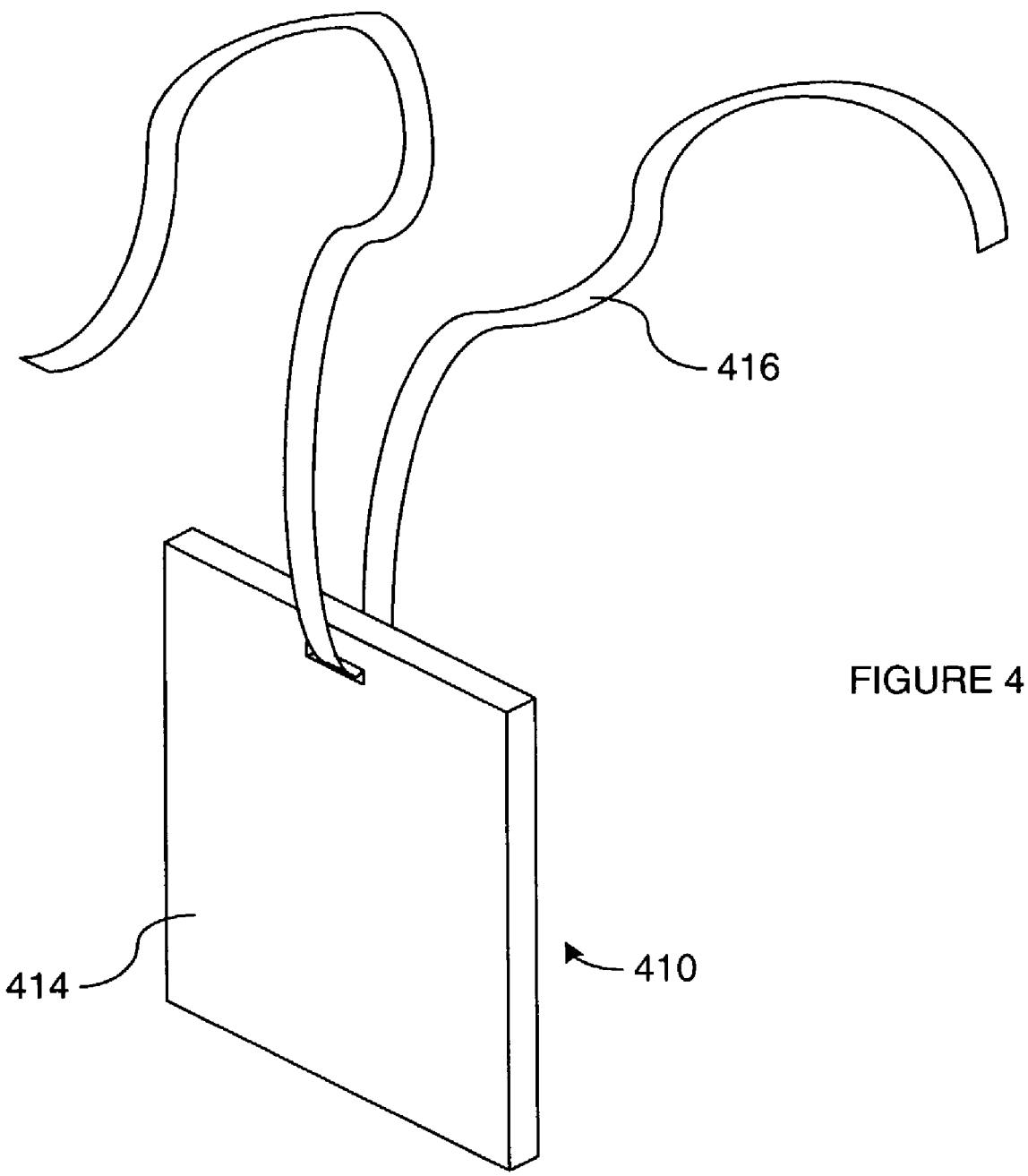
FIG. 4 depicts another alternate embodiment of a security device.

FIGS. 3 and 4 depict other possible embodiments of security devices that exemplify what has been stated earlier, that a security device within the scope of the invention as claimed may take any of a variety of forms.

Security device 310 is in the form of a ring that may be worn on a finger of body portion 320 of a designated person. In a manner largely corresponding to security devices 110 and 210 of FIGS. 1a, 1b, 2a and 2b, security device 310 is activated at an activation station (not shown), remains activated as long as security device 310 remains in close proximity to body portion 320, and automatically deactivates itself upon being removed from being in close proximity to body portion 320.

FIGS. 2a and 2b are largely parallel depictions of aspects of differing embodiments in which a security device is used to restrict access to a computer. Like security device 110 of FIGS. 1a and 1b, a security device 210, such as a security device 210a in FIG. 2a and a security device 210b in FIG. 2b, is depicted as being of a physical form that is somewhat akin to a typical wristwatch. Security device 210 is shown as being in close proximity to body portion 220 of a designated person seeking access to computer system 250. As shown, computer system 250 is a typical single user computer system that includes chassis 252 having a processor and memory to both execute and store software, as well as interface circuitry to couple the processor and memory within chassis 252 to devices such as display 254, keyboard 256 and pointing device 258.

There is also interface circuitry within chassis 252 to couple the processor and memory within chassis 252 to receiver 248, and the processor and memory within chassis 252 execute and store software that causes computer system 250 to use a receiver 248, such as a receiver 248a in FIG. 2a and a receiver 248b in FIG. 2b, to await the receipt of a signal from an active security device. When activated in a manner such as was depicted in FIGS. 1a and 1b, security device 210 transmits a signal to receiver 248. Upon receipt of this signal via receiver 248, the software causes computer system 250 to examine the received signal to determine if the signal is from a security device in close proximity to a designated person who should be permitted to have access to computer system 250. If it is determined that the signal is from a security device in close proximity to such a designated person, then the software provides the designated person with access to computer system 250, possibly by unlocking keyboard 256 and pointing device 258, and/or allowing data to which computer system 250 has access to be visible on display 254.

Figure 5:
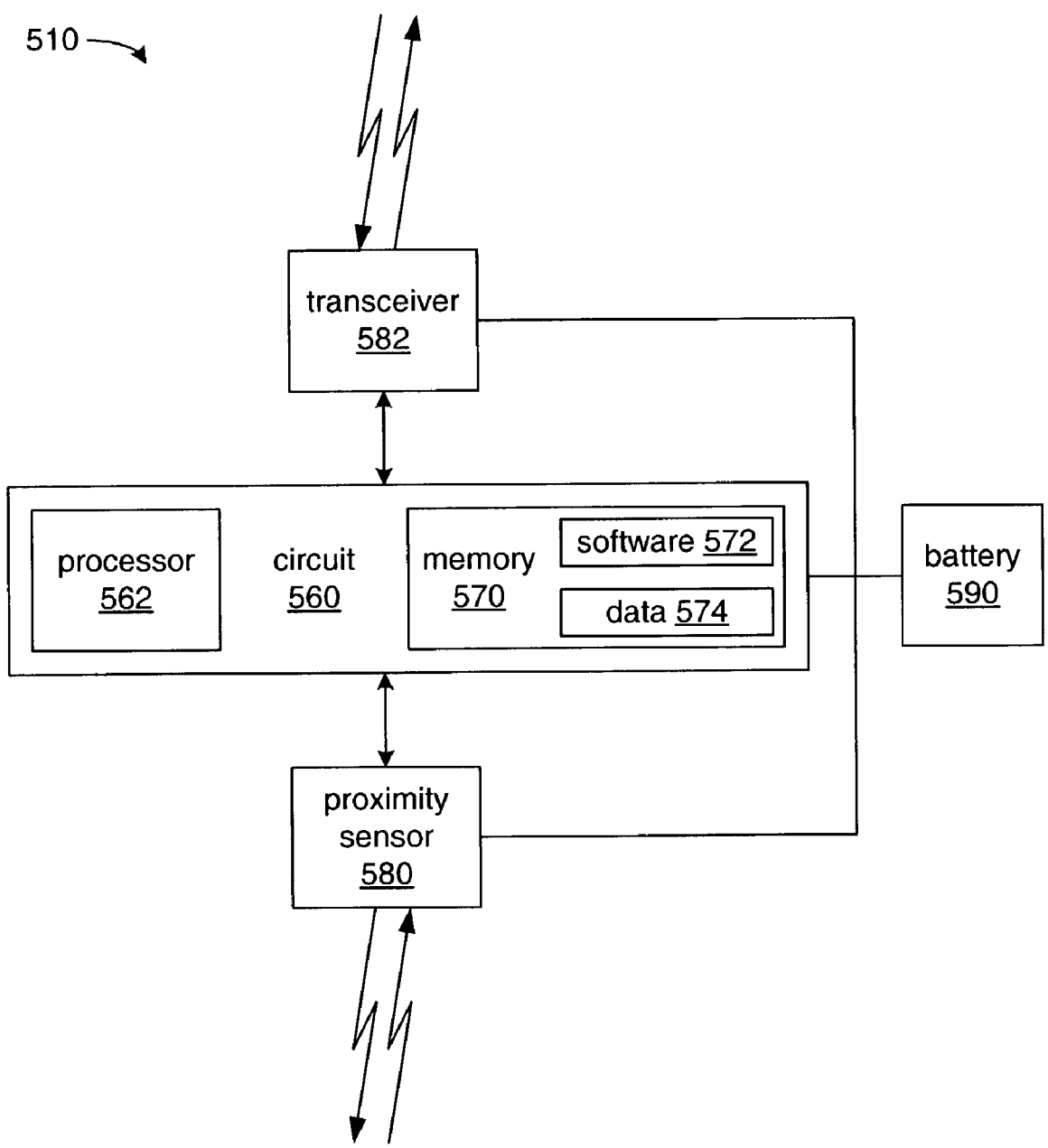
FIG. 5 is a block diagram of an embodiment of security device.

FIG. 5 is a block diagram of an embodiment of security device. Security device 510 includes processor 562 coupled to memory 570, proximity sensor 580, and transceiver 582. Depending art the specific design, shape and/or physical size of security device 510, processor 562 and memory 570 may be integrated into a single circuit 560, especially if circuit 560 is a microcontroller circuit of the variety commonly found in many modern day appliances and devices such as calculators and wristwatches. Circuit 560, proximity sensor 580 and transceiver 582 are all coupled to battery 590 which serves as a power source. Battery 590 may be either a rechargeable or non-rechargeable battery, or could be substituted for or augmented by another power source (not shown) without departing from the scope or the invention as hereinafter claimed.

In a manner corresponding to the earlier discussion of activating security device 110 of FIGS. 1a and 1b, a designated person brings security device into close proximity with some portion of their body (not shown) and proceeds to an activation station (not shown) where security device 510 may be activated. At the activation station, whether by an automatic process using a biometric reader or through the work of security personnel using any of a number of techniques to identify The designated person, and presuming that the designated person is identified as an appropriate designated person, security device 510 is activated. As part of being activated, software 572 within memory 570 is executed by processor 562 and causes processor 562 to receive security data 574 through transceiver 582 and stores security data 574 in memory 570. In some embodiments, security data 574 could be a relatively simple security key such as a numeric value or string of characters, or in other embodiments, security data 574 could be a more complex security key such as a portion of a formula used in performing a calculation. Upon reading the description herein, one of skill in the art will appreciate, that the exact nature of what makes up security data 574 is outside the scope of the invention as hereinafter claimed. Furthermore, regardless of what makes up security data 574, security data 574 may be encrypted.

Once activation has occurred processor 562 is caused to monitor input from proximity sensor 580 to determine if security device 510 is still in close proximity to the body of the designated person. If security device 510 is determined to no longer be in close proximity to the body of the designated person, then processor 562 deactivates security 510 by erasing or otherwise disabling at least a portion of security data 574. In one embodiment, the erasing or disabling of security data 574 may be carried out by way of processor 562 overwriting at least a portion of memory 570 where security data 574 resides. In another embodiment, at least a portion of security data 574 is erased by processor 562 disconnecting memory 570 from battery 590.

In a manner corresponding to the earlier discussion of using security key 210 of FIGS. 2a and 2b, while security device 510 is still activated, the designated person may use security device 510 to gain access to preselected machines, places and/or pieces of information. To do so, the designated person brings security key 510 into to a point where transceiver 582 is able to interact with a receiver controlling access to the machine, place and/or piece of information to which the designated person desires access, while still keeping security key 510 in close proximity to their body. In that interaction between such a receiver and transceiver 582, processor 562 is caused by software 572 to provide at least a portion of security data 574 to such a receiver through transceiver 582.

Figure 6:
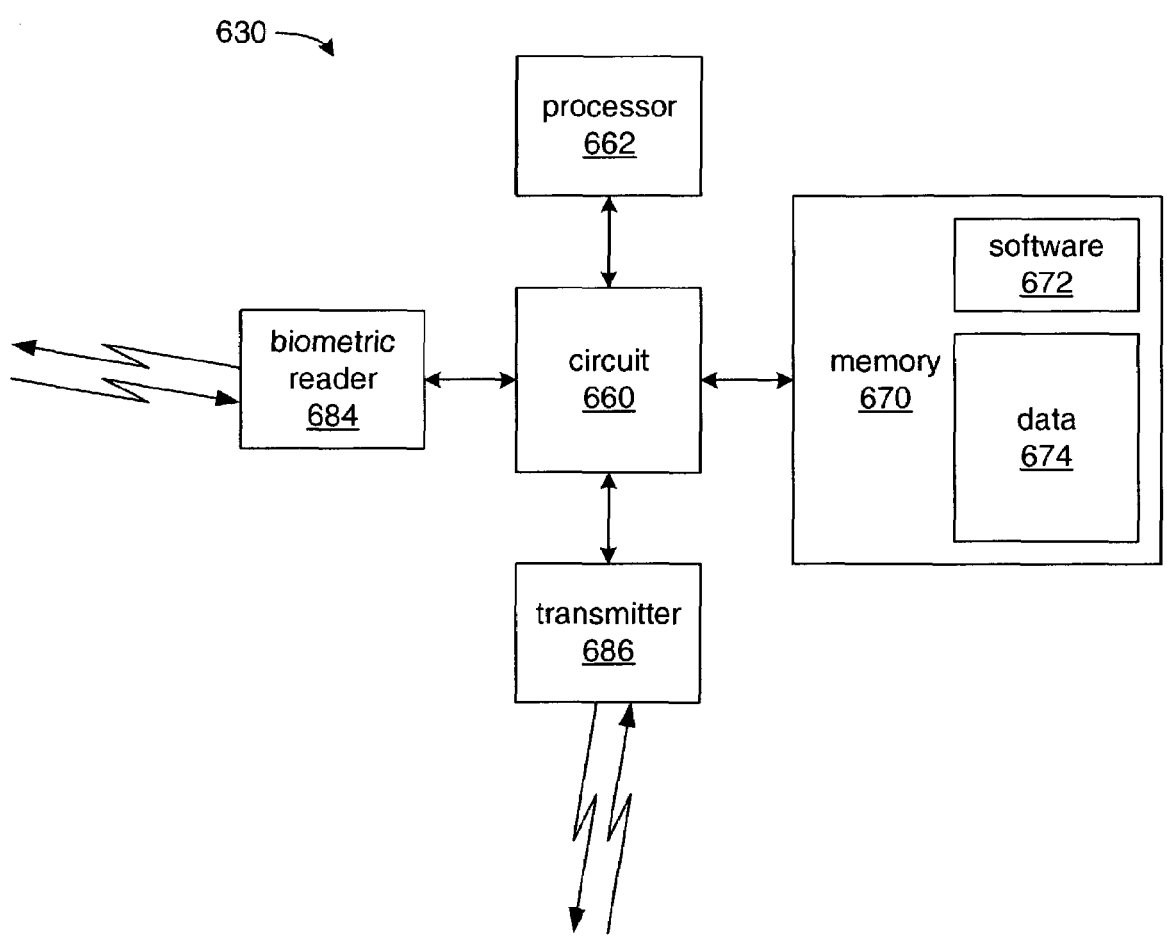
FIG. 6 is a block diagram of an embodiment of an automated activation station.

FIG. 6 is a block diagram of an embodiment of an automated activation station. Activation station 630 includes processor 662 coupled to memory 670, biometric reader 684, and transmitter 686. Depending on various possible design considerations, processor 662 may be coupled to memory 670, biometric reader 684 and/or transmitter 686 through circuit 660, but the exact manner in which various parts of activation station 630 are interfaced or coupled is beyond the scope of the invention as hereinafter claimed.

In a manner corresponding to the earlier discussion of activating security device 110 of FIGS. 1a and 1b, a designated person brings a security device (not shown) into close proximity with some portion of their body (not shown) and proceeds to activation station 630 where their security device may be activated. At activation station 630, processor 662 accesses and executes software 672 stored in memory 670, causing processor 662 to monitor input from biometric reader 684 to determine if a person providing a biometric reading through biometric reader 684 is a designated person for whom a security device should be activated. This determination may be made by comparing the input received from biometric reader 684 with a portion of data 674, if data 674 stored in memory 670 includes biometric data for a designated person, perhaps as part of a database of biometric data for multiple designated persons. Presuming that the person providing the biometric reading through biometric reader 684 is a designated person for whom a security device should be activated, then processor 662 is caused by software 672 to use transmitter 686 to at least transmit a piece of security data through transmitter 686 to a security device brought to activation station 630 by such a person.

As previously discussed, the security data transmitted through transmitter 686 may be a simple security key, possibly including a value or character string, or may be something of greater complexity. Furthermore, as previously discussed with reference to possible embodiments of activation station 130 of FIG. 1b, in possible alternate embodiments of activation station 630, transmitter 686 may actually be a two-way transceiver. In such embodiments, processor 662 might be caused by software 672 to receive a signal from a security device brought to activation station 630 to identify either the specific security device or perhaps some aspect of the security device. This may be done to determine whether or not the security device is an approved security device and/or to determine aspects of the design of the security device which may have bearing on some aspect of how the security device is to be activated and/or subsequently used.

Figure 7:
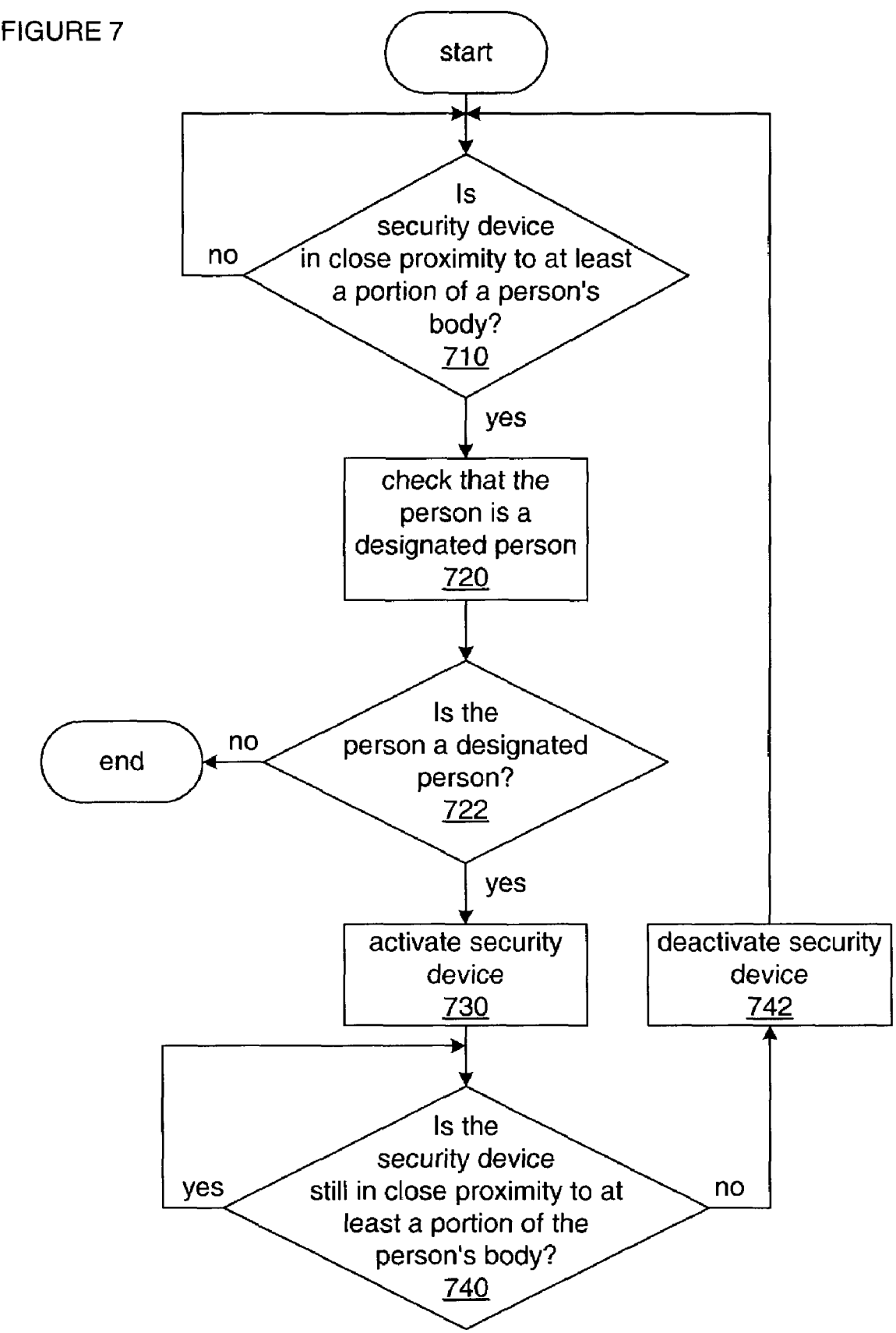
FIG. 7 is a flow chart of an embodiment of activation and deactivation of a security device.

FIG. 7 is a flow chart of an embodiment of activation and deactivation of a security device. Starting at 710, a determination is made as to whether or not it is in close proximity with a portion of a person's body. This determination at 710 may be performed entirely by the security device, itself, or may entail a check being made at an activation station or with the participation of security personnel performing a visual inspection. Provided that the security device is in close proximity with at least a portion of the person's body, then at 720, a check is made as to whether the person is a designated person for whom the security device should be activated. This check of the person could be done automatically at a fully automated activation station, possibly using a biometric reader to aid in identifying the person, or it could be done with involvement of security personnel relying on any of a number of approaches to identifying the person. If, at 722, the person is found to be a designated person, then the security device is activated at 730. From then on, at 740, the security device will repeatedly check to see if the security device is still in close proximity to at least a portion of the person's body. However, if at 740, the security device ceases to be in close proximity to some portion of the person's body, then the security device deactivates itself at 742.

Figure 8:
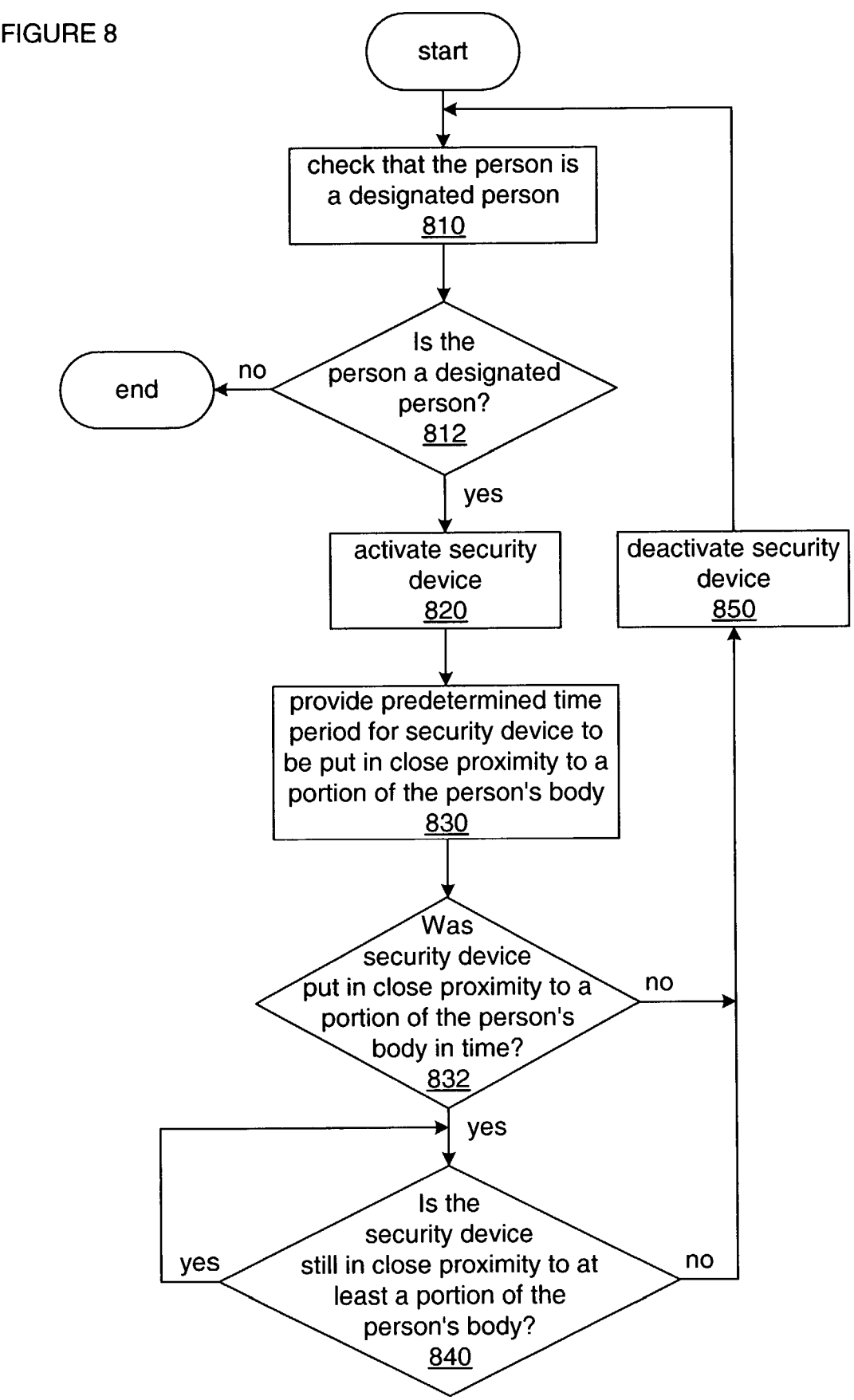
FIG. 8 is a flow chart of another embodiment of activation and deactivation of a security device.

FIG. 8 is a flow chart of another embodiment of activation and deactivation of a security device. Starting at 810, a check is made as to whether the person is a designated person for whom the security device should be activated. This check of the person could be done automatically at a fully automated activation station, possibly using a biometric reader to aid in identifying the person, or it could be done with involvement of security personnel relying on any of a number of approaches to identifying the person. If, at 812, the person is found to be a designated person, then the security device is activated at 820. However, upon being activated, a predetermined period of time is provided in which to put the security device in close proximity to at least a portion of the person's body at 830. If, at 832, the security device was not put in close proximity to at least a portion of the person's body within the predetermined period of time, then the security device deactivates itself at 850. However, presuming that the security device is found to have been put in close proximity with at least a portion of the person's body at 832, then at 840, the security device will repeatedly check to see if the security device is still in close proximity to at least a portion of the person's body. If at 840, the security device ceases to be in close proximity to some portion of the person's body, then the security device deactivates itself at 850.

Referring variously to embodiments of security devices depicted in all of the figures, although the above discussion has focused on embodiments of security devices supporting a single piece of security data possibly providing only a single security key, upon reading the description herein, it will be readily understood by those skilled in the art that an embodiment of a security device could support multiple pieces of security data and/or multiple security keys. It may be that within a place of business or within an organization, different designated persons are meant to be granted access to different things, people or parts of a location, and so each of these individual items to which access could be granted requires a different piece of security data and/or different security key. In other words, each designated person may be provided with a different set of pieces of security data and/or security keys, depending on what people, places or things each particular designated person is to be permitted to access. Alternatively, it may be that multiple unrelated businesses and/or organizations make use of security systems in which a security device could be shared across those businesses and/or organizations. In other words, a designated person could have one security device capable of working with multiple pieces of security data and/or security keys used by entirely unrelated entities, such as the designated person's bank ATM and the designated person's workplace such that the same security device could be used to provide access to both.

The invention has been described in conjunction with the preferred embodiment. Numerous alternatives, modifications, variations and uses will be apparent to those skilled in the art in light of the foregoing description. Upon reading the description herein, it will be understood by those skilled in the art that the invention as hereinafter claimed may be practiced in support of a wide variety of security regimes and/or to restrict access to any of a wide variety of possible places, things or other persons. Also, although the discussion of providing security has centered entirely around having security devices carried in close proximity to the body of a designated person, it will be appreciated that the invention as hereinafter claimed may also be practiced in the context of security devices carried in close proximity to objects such as vehicles or organisms other than people such as plants and/or animals.

What is claimed is:

1. A security device comprising:
    a proximity sensor to sense a proximity of the security device to at least a portion of a designated person's body;
    a transceiver to transmit and receive security data, the transceiver to communicate with an activation station, wherein the transceiver is to receive security data to activate the security device based on authorization from the activation station, and wherein the activation station has a biometric reader to take a biometric reading of the designated person, and wherein the activation station is to verify biometric readings of the designated person; and
    a circuit to automatically deactivate the security device if at least one condition occurs, the condition selected from the group of conditions consisting of a first condition that the security device fails to be put into close proximity to the at least a portion of the designated person's body within a predetermined time period, and a second condition that the security device ceases to be in close proximity to the portion of the designated person's body after the predetermined time period expires, wherein deactivation results in a denial of service to the person using the security device, and wherein the security device is separate and separable from the activation station.

2. The security device of claim 1, wherein the proximity sensor is comprised of a temperature sensor to sense a temperature of the designated person's body.

3. The security device of claim 1, wherein the proximity sensor is comprised of electrodes to sense nerve impulses of the designated person's body.

4. The security device of claim 1. wherein the proximity sensor monitors blood flow to sense whether or not the security device is in close proximity to the designated person's body.

5. The security device of claim 4, wherein the proximity sensor is comprised of a radar receiver to monitor blood flow.

6. The security device of claim 1, wherein being in close proximity to the designated person's body requires that the security device be in contact with the designated person's skin.

7. The security device of claim 1, wherein the circuit that deactivates the security device does so by erasing the security data received by the transceiver.

8. The security device of claim 1, further comprising an activity control to cause the security device to be disabled in response to user input at the activation station in communication with the security device.

9. The security device of claim 1, wherein the portion of the designated person's body is a wrist, and the security device is configured to be strapped to the wrist.

10. The security device of claim 1, wherein the security device is configured to be worn around the neck of the designated person.

11. The security device of claim 1, wherein the circuit is further to activate the security device if the security device receives the security data from the activation station and the security device is in close proximity to the portion of the designated person's body, and wherein a biometric reading from the designated person matches previously acquired biometric data known to be from the designated person.

12. The security device as recited in claim 1, wherein the designated person is to be denied access to a place or thing when the security device is in a deactivated state and granted access to the place or thing when the security device is in an activated state.

13. An apparatus comprising:

a biometric reader coupled to an activation station;

a memory to store biometric data of at least one designated person;

a circuit to receive data from the biometric reader, compare the data received from the biometric reader with biometric data stored in the memory; and a transmitter at the activation station to interact with a transceiver of a security device to activate the security device if the data from the biometric reader is found to be provided by the at least one designated person and the security device is in close proximity to a portion of the at least one designated person's body, wherein the security device is to automatically be deactivated if the security device ceases to be in close proximity to a portion of the at least one designated person's body for a predetermined time, wherein the activation station is separate and separable from the security device.

14. The apparatus of claim 13, wherein the biometric reader is to read finger prints.

15. The apparatus of claim 13, wherein the biometric reader is to read hand prints.

16. The apparatus of claim 13, wherein the biometric reader is to scan a retina.

17. The apparatus of claim 13, wherein the transmitter is to transmit security data to a security device to activate the security device.

18. The apparatus of claim 17, wherein the transmitter is also capable of receiving data from the security device, and is to receive data from the security device to identify an aspect of the security device prior to transmitting security data to the security device to activate the security device.

19. A method comprising:

taking a biometric reading at an activation station from at least a portion of the body of a designated person;

comparing the biometric reading to previously acquired biometric data known to be from the designated person; and transmitting a signal to a security device to activate the security device if the biometric reading matches the previously acquired biometric data; and automatically deactivating the security device if at least one condition occurs, where the condition is selected from the group of conditions consisting of (a) the security device fails to be put into close proximity to the portion of the designated person's body, (b) the security device ceases to remain in close proximity to the body of the designated person, and if the biometric reading does not match the previously acquired biometric data, wherein the activation station is separate and separable from the security device.

20. The method of claim 19, wherein transmitting a signal to the security device will not activate unless the security device is in close proximity to the body of the designated person before the signal is transmitted to the security device.

21. The method of claim 19, wherein activating the security device comprises transmitting security data to the security device by an activation station, and deactivating the security device comprises erasing security data stored within the security device.

22. A machine-accessible medium comprised of instructions that when executed by a processor within a security device, causes the security device to:

take a biometric reading at an activation station from at least a portion of the body of a designated person;

compare the biometric reading to previously acquired biometric data known to be from the designated person; and transmit a signal to a security device to activate the security device if the biometric reading matches the previously acquired biometric data; and automatically deactivate the security device if at least one condition occurs, where the condition is selected from the group of conditions consisting of (a) the security device fails to be put into close proximity to the portion of the designated person's body, (b) the security device ceases to remain in close proximity to the body of the designated person, and if the biometric reading does not match the previously acquired biometric data, wherein the activation station is separate and separable from the security device.

23. The machine-accessible medium of claim 22, further comprising instructions that when executed by the processor, will cause the security device to activate the security device in response to receiving security data from an activation station and to deactivate the security device by erasing at least a portion of the security data.

24. The machine accessible medium of claim 22, further comprising instructions to transmit biometric data of a person in close proximity of the security device to the activation station, wherein the activation station is to determine whether the person is an authorized person based on verification of the biometric data.

* * * * *